A. T. McWANE

Feb. 24, 1931. WINDOW GUARD Re. 17,978

Original Filed Sept. 3, 1927 2 Sheets-Sheet 1

Inventor
Arthur T. McWane
By
Attorney

A. T. McWANE

WINDOW GUARD

Feb. 24, 1931.

Re. 17,978

Original Filed Sept. 3, 1927 2 Sheets-Sheet 2

Inventor

Arthur T. McWane

By

W. S. Thurston

Attorney

Reissued Feb. 24, 1931

Re. 17,978

UNITED STATES PATENT OFFICE

ARTHUR T. McWANE, OF BIRMINGHAM, ALABAMA

WINDOW GUARD

Original No. 1,693,853, dated December 4, 1928, Serial No. 217,364, filed September 3, 1927. Application for reissue filed December 3, 1930. Serial No. 499,823.

My invention relates to window guards for use in connection with sliding sashes, and among other objects, aims to provide an improved collapsible guard for the lower window sash having provision to be opened and closed at will as the sash is raised and lowered and also having means either to connect the guard to the inside of the lower sash whereby the guard may be opened and closed with it or to lock the guard in closed position to the inside of the upper sash. Further, the invention contemplates means whereby the guard may be collapsed so as to occupy a relatively small space below the lower rail of the upper sash where it is relatively inconspicuous.

Apparatus embodying features of my invention is illustrated in the accompanying drawing, wherein.

Figure 1:
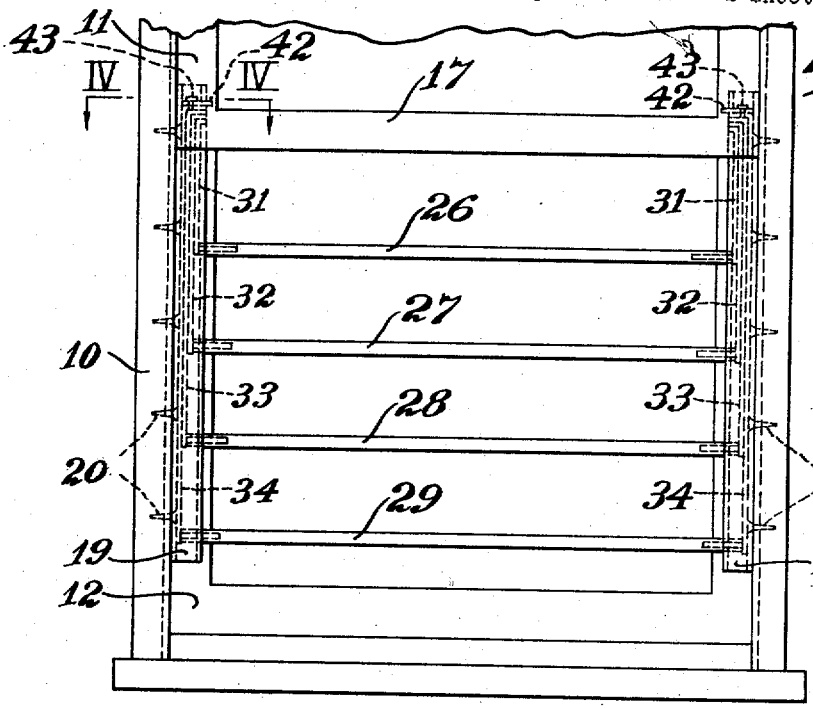
Fig. 1 is a view in front elevation of the lower part of a window having my improved guard means applied thereto and showing the guard in closed position.

Referring now to the drawing, wherein like numerals refer to the same parts throughout, the preferred form of guard is applied to a window having a frame 10, an upper sash 11 and a lower sash 12. Arranged in the window frame are guide rails 13, 14 and 16 which cooperate to form spaced guides for the upper and lower sashes of the window, permitting their being raised or lowered. The lower rail 17 of the upper sash 11 and the upper rail 18 of the lower sash 12 are provided with the usual cooperating beveled portions so that the rail 18 overlaps the rail 17 when the window is closed.

Figure 4:
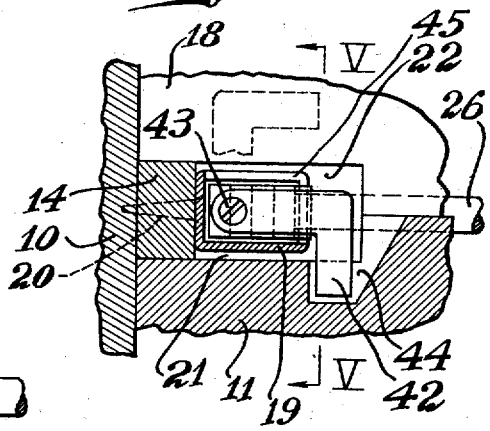
Fig. 4 is a sectional view drawn to a larger scale along line IV—IV of Fig. 1.

Secured to the guide rails 14 are a pair of vertically disposed, channel-shaped guide members 19, providing opposed runways for the guard. The guides 19 are conveniently secured to the sash guide rails 14 by a plurality of screws 20, which, as will be seen from the drawing, are covered so as to be inaccessible when the guard is closed. The sash rails 17 and 18 are notched, as shown at 21 and 22 in Fig. 4, so that the window sashes may move freely over the guide rail 14 and the guide means 19.

Figure 6:
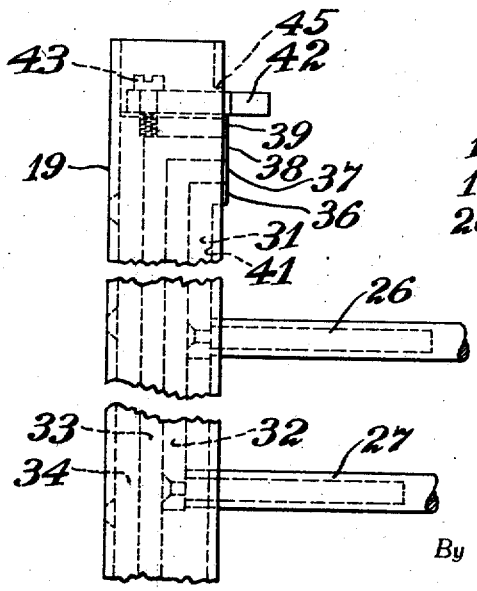
Fig. 6 is a detail fragmentary view in side elevation of the guard removed from the window.
Figure 2:
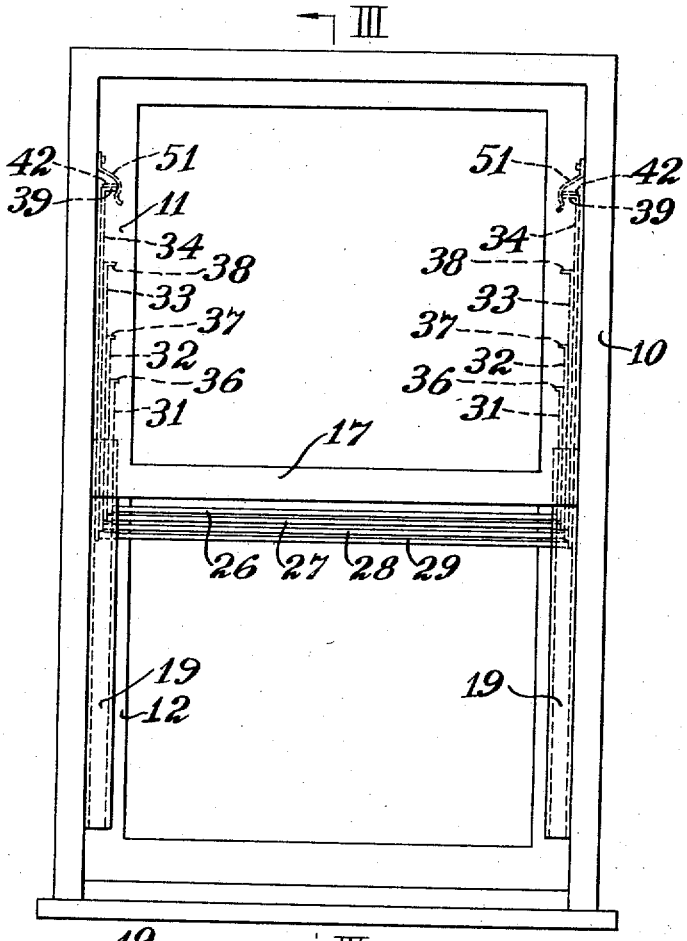
Fig. 2 is a view in front elevation of a window with the guard in open position.
Figure 3:
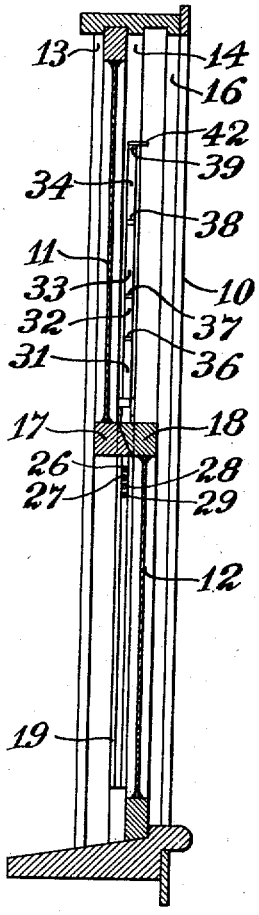
Fig. 3 is a sectional view taken along line III—III of Fig. 2.

My improved window guard is shown as being made of a plurality of bars 26, 27, 28 and 29 slidably mounted in the guides 19. Each of the bars is shown as being removably secured to upstanding runners at both ends fitting into the guide means 19 and adapted to move freely therein. As may be seen more clearly in Fig. 6, the upper bar 26 is provided with runners 31, the bar 27 with runners 32, the bar 28 with runners 33 and the bar 29 with runners 34. These several runners are disposed in overlapping relation, forming a telescopic arrangement which permits the bars to lie close together as shown in Fig. 2 when the guard is opened and collapsed. The runners 31 to 34 inclusive are provided at their upper ends with horizontally extending, interengaging elements 36, 37, 38 and 39, respectively. The lengths of the respective runners 31 to 34 are such that when the horizontally extending elements 36 to 39 are in engagement, the guard is closed and the bars are held in predetermined spaced relation. When in the closed position, downward movement of the upper bar 26, and consequently the other bars, is prevented by engagement of the elements 36 with the upper edges of closure members or cross walls 41 on the guide channels 19.

In order to lock the guard in its closed position and with the bars in their fixed spaced relation, I provide, on the upper element 39, a pivoted latch or lock 42 held in place by a screw 43 and adapted to coact with a notch 44 provided in the upper sash 11 and a notch 45 provided in the guide 19. As may be seen from Fig. 5, with the latch 42 in notch 45, the guard is securely held in closed position and the latch is only accessible from the inside of the window, and when the sash 12 is lowered. If the latch is turned far enough to engage the notch 44 in the sash 11, the sash 11 is locked against lowering.

Figure 5:
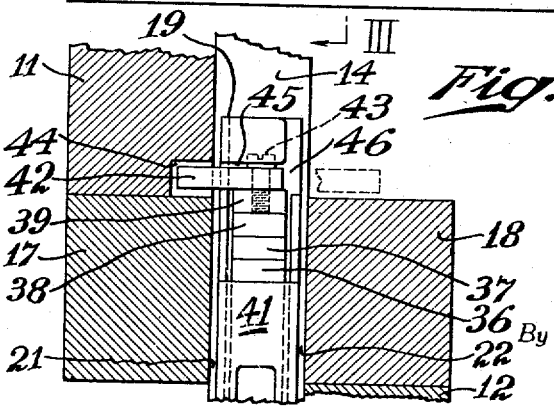
Fig. 5 is a sectional view along line V—V of Fig. 4.

In the upper end of the guide means 19, on each side of the window, and at right angles to the notch 45, is provided a notch 46 which permits the latch 42 to be turned around to the dotted position shown in Fig. 5, in which position it overhangs the upper rail 18 of the lower sash 12. With the latch 42 in this position when the lower sash 12 is raised it raises the lower bar 29 which, in turn engages the bar 28, the bar 28 engages the bar 27 and so on, thus raising all of the bars telescoping the runners 31 to 34 inclusive, and opening or collapsing the guard. When in raised position, the upper horizontally extending elements 39 are engaged by a pair of spring catches 51 arranged in the sides of the window frame, so as to hold the guard in its open position. In this position, it is not unsightly, and does not give the appearance of a barred window. Whenever it is desired to close the guard to prevent intruders from entering, the catches 51 are disengaged, the bars are lowered until the elements 36 engage the closure member 41 and all of the horizontally extending elements are lying one on top of the other. The bars are then in their properly spaced relation, and the guard may be locked, after lowering the sash 12, by means of the latch 42. In this position, the lower sash 12 may be freely raised and put in any desired position, without interfering with the guard, and the upper sash 11 is firmly locked in place with the guard.

From the foregoing, it will be apparent that I have devised an improved collapsible window guard which may be readily locked against intruders and may be opened to occupy very little space when desired. Further, all of the parts can be manufactured at a relatively low cost and will occupy a minimum shipping space. Moreover, any ordinary carpenter can secure the parts to a window.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:

1. In a window guard adapted to be opened and closed, a plurality of unconnected bars, individual runners for each of the bars, guide means for the runners, and means cooperating with the runners and the guide means for holding the bars in spaced relation when the guard is in closed position.

2. In a window guard adapted to be opened and closed, a plurality of unconnected bars, individual runners for each of the bars, guide means for the runners, means cooperating with the runners and the guide means for holding the bars in spaced relation when the guard is in closed position, and means associated with the last mentioned means and accessible only from the inside of the window for holding all of said bars in fixed spaced relation when the guard is closed.

3. The combination with a window frame and a pair of vertically slidable sashes, of spaced apart guides for the sash, a guard guide interposed between the guides for the sash, a plurality of horizontal guard members having portions slidably fitting in the guard guide and disposed to permit the members to lie in closely spaced relation when the guard is open, means carried by the slidably fitting portion for automatically spacing the guard members when in closed position, and means inaccessible from the outside of the window for locking the guard members in closed position.

4. In a window guard adapted to be opened and closed, a plurality of unconnected bars, guide means, and individual runners for each of the bars and disposed in overlapping relation with respect to each other in the guide means to permit the bars to be moved into closely spaced relation when the guard is opened.

5. In a window guard adapted to be opened and closed a plurality of bars, guide means, individual runners for each of the bars and disposed in overlapping relation with respect to each other in the guide means to permit the bars to be moved into closely spaced relation when the guard is opened, and interlocking means carried by the runners for holding the bars in predetermined spaced relation when the guard is in closed position.

6. In a window guard adapted to be opened and closed, a plurality of bars, guide means, individual runners for each of the bars and disposed in overlapping relation with respect to each other in the guide means to permit the bars to be moved into closely spaced relation when the guard is opened, interlocking means carried by the runners for holding the bars in predetermined spaced relation when the guard is in closed position, said interlocking means including a member controlling all of said runners when the guard is closed, and latch means for said member accessible only from the inside of the window.

7. In a guard for the lower part of a window having upper and lower sash, a pair of vertically disposed guides arranged on opposite sides of the window, a plurality of bars, a corresponding number of pairs of runner members secured to the bars and arranged in telescoping relation in the guides permitting opening of the guard by telescoping the runners, means coacting with the runners for holding the bars in telescoped closely spaced relation when the guard is open, and interengaging elements carried by the runner members for determining the spaced relation of the bars when the guard is closed.

8. In a guard for the lower part of a window having upper and lower sash, a pair of vertically disposed guides arranged on opposite sides of the window, a plurality of bars, a corresponding number of pairs of runner members secured to the bars and arranged in telescoping relation in the guides permitting opening of the guard by telescoping the runners, means coacting with the runners for holding the bars in telescoped closely spaced relation when the guard is open, interengaging elements carried by the runner members for determining the spaced relation of the bars when the guard is closed, and means coacting with the upper sash and the interengaging elements and accessible only from the inside of the window for locking the bars in place when the guard is closed.

9. The combination with a window embodying upper and lower sash and a frame, of spaced apart lateral guides for the sash; guide means interposed between the sash guides; a plurality of bars comprising a guard for the lower portion of the window, each having upstanding runners at the ends in the guide means and the several runners being arranged in overlapping relation in the guide means; horizontal members provided on the runners and arranged in overlapping relation, said runners being of such length that when the guard is closed the horizontal members lie one against the other in the guide means; means preventing further downward movement of the lower horizontal members when the guard is closed; and means accessible only from the inside of the window and cooperating between the guide means and the upper horizontal member for latching said upper horizontal member.

10. The combination with a window embodying upper and lower sash and a frame, of spaced apart lateral guides for the sash; guide means interposed between the sash guides; means for securing the guide means to the frame; a plurality of bars comprising a guard for the lower portion of the window, each having upstanding runners at the ends fitting in the guide means and the several runners being arranged in overlapping relation in the guide means; horizontal members provided on the runners and arranged in overlapping relation, said runners being of such length that when the guard is closed, the horizontal members lie one against the other in the guide means and over the means for securing the guide means to the frame; a stop provided in the guide means preventing further downward movement of the lower horizontal members; and a latch means associated with the upper horizontal members and coacting with the upper sash and the guide means for preventing lowering of the upper sash or raising of the guard.

11. Apparatus in accordance with claim 10 wherein the latch means is adapted to engage the upper rail of the lower sash when the sash is down and to open the guard simultaneously with the lower sash.

12. In combination with a window having sliding sashes, a collapsible guard for the lower sash; means operatively to connect the guard to the lower sash so that it may be collapsed as said sash is raised and closed as the sash is lowered; and means to lock the guard to the upper sash when both the guard and upper sash are closed whereby to prevent either from being opened from the outside.

13. In combination with a window having sliding sashes, a collapsible guard for the lower sash; runners associated with the guard at opposite sides of the sash opening; means operatively to connect said runners to the lower sash so that when said sash is raised the guard will be opened and collapsed below the upper sash; and means to lock the runners with respect to the upper sash when the upper sash and the guard are in closed position.

14. In combination with a window having sliding sashes, a collapsible guard for the lower sash arranged to be opened and closed with said sash; means accessible from the inside of the window to connect the guard for operation by the lower sash as it is raised and lowered; and means to lock the guard in closed position with respect to the upper sash.

15. In combination with a window having sliding sashes, a guard for the lower sash comprising a plurality of spaced transverse bars; vertical runners of different lengths connected to said bars; guides at the sides of the window opening for the runners; means operatively connecting the runners for the lowermost bar to the lower sash whereby they are raised and lowered with the sash, the other bars being arranged to be raised by the lower bar as the lower sash is raised so that the guard is collapsed below the lower sash rail of the upper sash; and latch means accessible from the inside of the window to lock the runners at each side to the upper sash when the guard is closed.

16. In combination with a window having sliding sashes, a collapsible guard comprising a series of bars extending across the window opening; means adapted to be connected at will to the lower sash to open and close said guard as the sash is opened and closed; said means including a latch member adapted to be disengaged from the lower sash and engaged with the upper sash to lock the guard in closed position independently of the lower sash; and means to suspend the guard in collapsed position when it is raised by the lower sash so that the lower sash can be operated independently of the guard.

17. In combination with a window having sliding sashes, a collapsible guard adapted to be connected to the lower sash so as to be opened and closed therewith; and means for disconnecting the guard from the lower sash and locking it in closed position with respect to the upper sash, said means being accessible only from the inside of the window.

In testimony, that I claim the foregoing as my own, I have hereunto affixed my signature.

ARTHUR T. McWANE.